C. K. SALISBURY.
BEARING FOR CENTRIFUGAL SEPARATORS.
APPLICATION FILED DEC. 2, 1910.
1,119,456.
Patented Dec. 1, 1914.
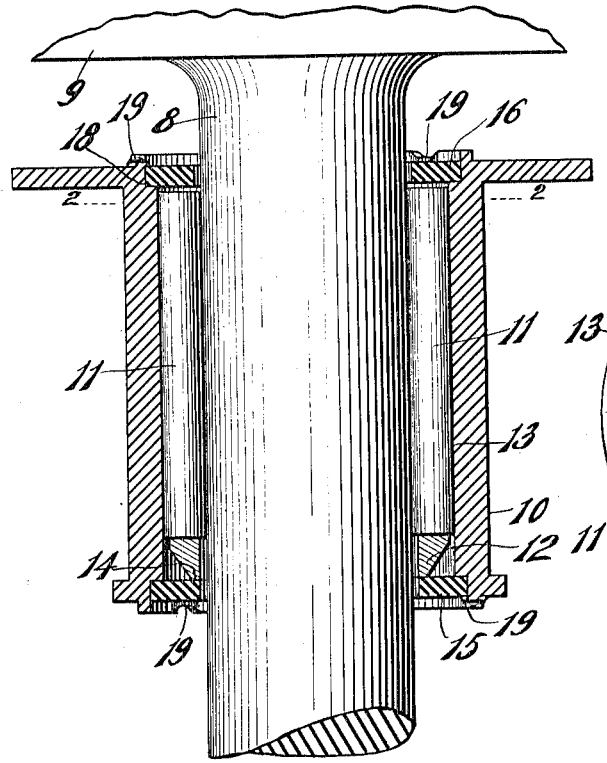
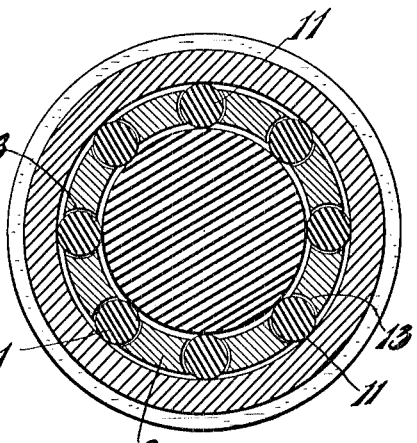
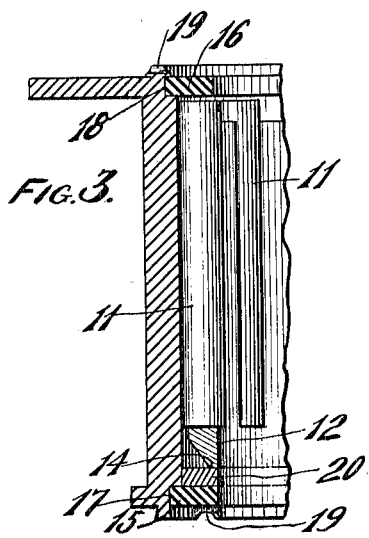
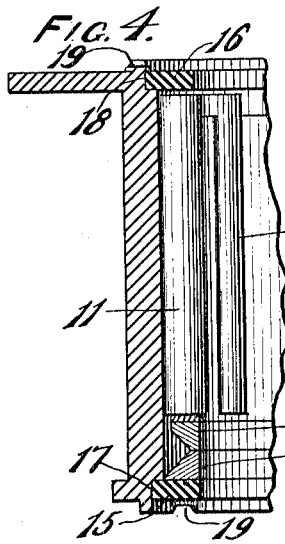
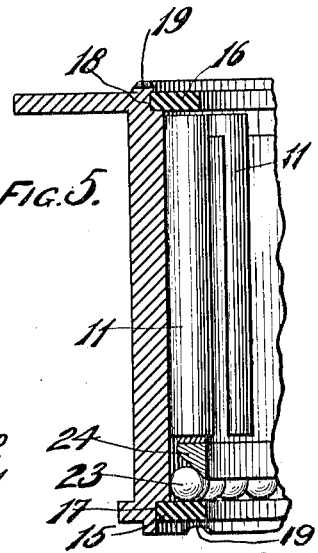
WITNESSES.
INVENTOR.
Charles K. Salisbury,
By Benedict, Morsell & Caldwell,
ATTORNEYS.

UNITED STATES PATENT OFFICE.

CHARLES K. SALISBURY, OF MILWAUKEE, WISCONSIN, ASSIGNOR TO STANDARD SEPARATOR COMPANY, A CORPORATION OF NEW JERSEY.

BEARING FOR CENTRIFUGAL SEPARATORS.

1,119,456.     Specification of Letters Patent.     Patented Dec. 1, 1914.

Application filed December 2, 1910. Serial No. 595,171.

*To all whom it may concern:*

Be it known that I, CHARLES K. SALISBURY, a citizen of the United States, residing in Milwaukee, in the county of Milwaukee and State of Wisconsin, have invented new and useful Improvements in Bearings for Centrifugal Separators, of which the following is a description, reference being had to the accompanying drawings, which are a part of this specification.

This invention relates to improvements in bearings for centrifugal separators and has for its particular object to provide a roller bearing for the upper portion of a centrifugal separator spindle.

A further object of the invention is to provide an upper or neck bearing for centrifugal separators which is simple in construction and operation and in which friction is reduced to a minimum degree.

With the above, and other objects in view, the invention consists of the centrifugal separator bearing and its parts and combinations as set forth in the claims, and all equivalents thereof.

In the accompanying drawing in which the same reference characters indicate the same parts in all of the views, Figure 1 is a vertical sectional view of the improved bearing shown in connection with a separator spindle; Fig. 2 is a horizontal sectional view thereof taken on line 2—2 of Fig. 1; Fig. 3 is a vertical sectional detail view of a modified form of the improved bearing; Fig. 4 is a similar view of another modified form; and Fig. 5 is a like view further modified.

Referring to the drawing the numeral 8 indicates the neck or upper portion of the vertical spindle of a centrifugal cream separator and 9 a portion of the bowl thereof. The neck or upper portion of the spindle extends through the bearing sleeve 10 which is yieldingly mounted in the frame of the machine (not shown) in any well known manner and the lower end of the spindle is supported and mounted in a step bearing (also not shown) well known in the art. Separator spindles are adapted to be rotated at very high rates of speed and in order to accomplish this result it is necessary to eliminate, as far as possible, friction and vibration in the upper bearing. To accomplish this result rollers 11 positioned within the sleeve 10 and between the sleeve and the spindle, are spaced a distance apart by the spacing collar or cage 12. The cage loosely surrounds the spindle and is of less diameter than the bore of the bearing sleeve. The rollers 11 are held in the recesses 13 of the cage in spaced relation with each other and extend beyond the inner and outer periphery of said cage and bear against the spindle and the bearing sleeve. The roller recesses 13, which are slightly larger in diameter than the diameter of the rollers in order that the rollers will turn freely therein, extend to a point a short distance from the lower end of the cage to form a support for the ends of the rollers and also to form the annular bearing edge 14 of the cage. This edge is reduced in diameter by beveling to reduce the bearing surface and to have the bearing surface as near the axis of the spindle as possible to reduce friction. The roller spacing cage 12 and the rollers 11 are held in position in the sleeve by means of annular washers 15 and 16 which are held in the opposite end recesses 17 and 18 of the sleeve by upsetting the flanged edges of said sleeve at a plurality of points as indicated by the numeral 19. The washer 15 also serves as a bearing for the annular bearing edge 14 of the cage 12 and is formed of hardened metal to withstand wear.

In the modified form shown in Fig. 3 an independent annular bearing 20 interposed between the lower washer and the bearing edge 14 of the cage is provided which may be replaced by another bearing when worn.

Fig. 4 shows another modification in which the lower end of the roller cage ends close to the lower ends of the cage recesses and two annular bearings 21 and 22 are interposed between said roller cage and the lower washer with narrow bearing surfaces engaging each other.

Fig. 5 shows another modification somewhat similar to the last mentioned form with the exception that balls 23 are substituted for the bearing 21 and the bearing 24 is formed slightly different in shape to provide a proper bearing for the balls.

In use the parts are assembled in the manner shown in the drawing and when the spindle is rotated it will have a rolling engagement with the bearing sleeve due to the rollers and the spacing cage and friction will be reduced to a considerable extent. The reduced diameter of the lower bearing surface of the spacing cage will also serve to further eliminate friction and provide a bearing particularly adaptable for high speed centrifugal separators.

From the foregoing description it will be seen that the bearing is very simple in construction and operation and is well adapted to perform the function desired.

What I claim as my invention is:

1. In combination with a centrifugal separator spindle, a bearing therefor comprising a sleeve through which the spindle extends, said sleeve provided with end recesses, rollers in engagement with and interposed between the spindle and the sleeve and spaced apart laterally, a spacing cage surrounding the spindle and positioned between the spindle and the sleeve and spaced therefrom, said spacing cage having its lower end reduced in diameter to position the supporting portion closer to the axis of the spindle and provided with recesses to accommodate the rollers and to hold them in spaced relation with each other, and washers surrounding the spindle and positioned in the end recesses of the sleeve, one of said washers serving as a supporting bearing for the reduced lower end of the spacing cage.

2. In combination with a centrifugal separator spindle, a bearing therefor comprising a sleeve through which the spindle extends, said sleeve provided with end recesses and flanged edges, a spacing cage surrounding the spindle and positioned between the spindle and the sleeve and spaced therefrom, said spacing cage having its lower end reduced in diameter to position the supporting portion closer to the axis of the spindle and provided with elongated roller recesses spaced a distance apart, rollers positioned within the cage recesses and extending through and beyond the inner and the outer peripheries of said cage and bearing against the spindle and the sleeve and resting directly on the lower end portion of the spacing cage, and annular washers surrounding the spindle and positioned in the end recesses of the sleeve, one of said washers serving as a supporting bearing for the reduced lower end of the cage, said flanged edges of the sleeve being upset to hold said washers in position.

In testimony whereof, I affix my signature, in presence of two witnesses.

CHARLES K. SALISBURY.

Witnesses:
R. S. C. CALDWELL,
KATHERINE HOLT.